United States Patent
Witte

[11] 3,730,630
[45] May 1, 1973

[54] OBSERVING DEVICE FOR HEATED SAMPLE CELLS

[75] Inventor: Wolfgang Witte, 777 Ueberlingen, Germany

[73] Assignee: Bodenseewerk Perkin-Elmer & Co., GmbH, Bodensee, Germany

[22] Filed: Dec. 21, 1970

[21] Appl. No.: 100,170

[52] U.S. Cl. ........................356/74, 356/85, 356/256
[51] Int. Cl. ...............................................G01j 3/02
[58] Field of Search..........356/85–87, 74; 240/44.26; 350/288

[56] References Cited

UNITED STATES PATENTS

| | | | |
|---|---|---|---|
| 3,431,397 | 3/1969 | Webb | 350/288 X |
| 1,794,586 | 3/1931 | Carter | 240/44.26 |
| 1,157,020 | 10/1915 | McCarthy | 240/44.26 |
| 1,412,380 | 4/1922 | Weston | 240/44.26 |

FOREIGN PATENTS OR APPLICATIONS

| | | | |
|---|---|---|---|
| 407,155 | 3/1934 | Great Britain | 240/44.26 |

Primary Examiner—Ronald L. Wibert
Assistant Examiner—F. L. Evans
Attorney—Edward R. Hyde, Jr.

[57] ABSTRACT

An opening in the housing surrounding a graphite tube sample cell of the type used for heating an atomic absorption sample may be used for introducing the sample and later (when the graphite cell is heated during sample measurement) must be closed to avoid escaping of the non-oxidizing gas introduced within the housing for protection of the graphite cell. It has already been proposed to construct such a closing device so as to allow observation of the graphite cell but existing devices do not allow observation of the graphite cell during sample measurement when it is red-hot. An improved combined observing and closure device utilizing the known principles of a pin-hole camera includes an apertured stop (preferably a field stop) and a ground-glass screen for receiving the image, all in a supporting tubular member which may be utilized as the closure. Preferably the parts of the device nearest the graphite tube cell (e.g., one surface of the aperture stop and its supporting structure) are made specularly reflecting.

3 Claims, 1 Drawing Figure

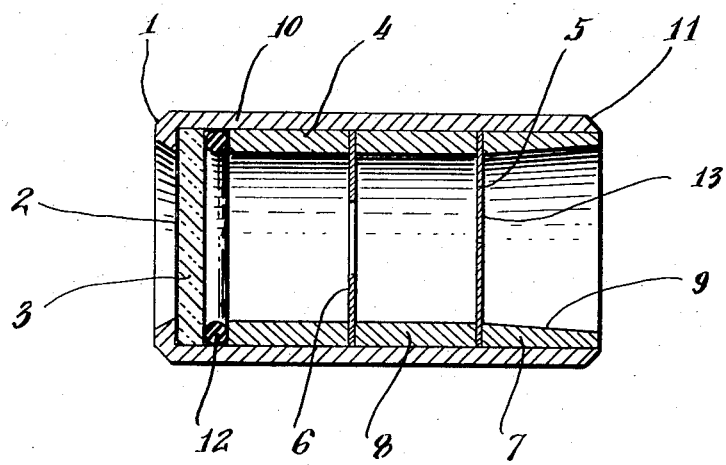

OBSERVING DEVICE FOR HEATED SAMPLE CELLS

This invention relates to a device for both closing and allowing observation in high temperature apparatus, specifically graphite tube cells used in flameless atomic absorption having an opening in the outer housing cell wall through which the sample under analysis is introduced. The device of the invention acts both as a closure of the opening and a device through which the graphite tube may be observed while in a state of incandescence.

In atomic absorption spectrometers, the sample under analysis has conventionally been injected into a burner flame in solution, in which dissociation of the sample substances into the individual atoms is effected. Through this flame a light beam is emitted from a selectively emitting light source which contains one or several resonant lines of a wanted element (see, for example, the U.S. Pat. No. 2,847,899 issued to A. Walsh). It is prior art to introduce the sample instead into a graphite tube through which a very strong heating current of, for instance, 500 amperes is supplied. The graphite sample tube is thereby heated to very high temperatures (on the order of 2,000°C), thereby causing vaporization of the sample and a dissociation of the sample substances into the individual atoms. The light beam of the atomic absorption spectrometer is directed through the graphite sample tube in a longitudinal direction. For introduction of (e.g., liquid) samples into the graphite tube, a small aperture is provided in the latter. The graphite sample tube or cell is arranged in a housing into which a protective gas, such as nitrogen, is introduced. The protective gas is circulated within the housing around the graphite tube both inwardly and outwardly in order to avoid oxidation and burning of the tube or cell. The housing surrounding the cell and the cell itself must have a lateral opening for introduction of the sample. At least the opening in the housing must be held closed during the measurement following introduction of the sample in order to avoid escape of the protective gas along this undesired path through the opening in the housing. During the measurements, observation of the incandescent graphite tube is extremely advantageous, since only by such observation can non-uniform temperature distributions caused by fine fissures or cracks in the graphite tube cell, caused by aging, be recognized.

A prior art device for closing graphite tube cells while allowing such observation comprises a cap mounted on a laterally attached socket on the graphite tube cell, the socket being used for sample introduction. This cap may be provided with a glass window through which the graphite tube can be observed. This device, however, suffers from the shortcoming that the graphite tube cannot be observed in a state of incandescence, that is, during the sample measurement, since the observer will be temporarily blinded or dazzled by the bright red-hot graphite tube.

To avoid this difficulty, replacing of the transparent clear window by a dark gray glass has been attempted. However, this glass is heated so strongly due to the radiation that is absorbed that it will burst.

It is also not feasible to use, instead of the transparent window, an interference filter which only transmits a small visible proportion and reflects the major proportion of the incident radiation, since because of the extraordinarily strong radiation (i.e., very high radiation flux density) such filters will be heated so much that the effective interference layers become destroyed.

It is an object of this invention, by avoiding the shortcomings of the prior arrangements, to provide such a closing and observing device which permits a dazzle-free observation of the graphite tube, especially when it is in a state of incandescence during the execution of the atomic absorption measurement.

According to the invention this object is attained by providing that the closing device is in the form of a pinhole camera (known per se) with a ground-glass or the like for observation of the incandescent graphite tube.

In the device according to the invention the aperture diameter of the apertured stop (acting as the "pinhole") is of a size sufficient for the formation of an image of sufficient brightness of the average-heated graphite tube cell.

According to the invention the surface of the apertured stop on the side of the graphite tube and the inner surfaces of the support of the apertured stop on the side of the graphite tube are designed to be reflecting.

An exemplary embodiment of the invention will now be described in greater detail with reference to the accompanying drawing, the sole FIGURE of which is a longitudinal central vertical section through a device according to the invention.

A cylindrical metal sleeve 10, forming the main body of the inventive device, has an annular inwardly extending flange 1 (at its left-hand end in the drawing), against which is mounted a ground-glass 3, having its ground surface 2 on its left-hand surface (i.e., the surface away from the graphite tube cell with which it is used). Spacer sleeves 4 and 8 determine the position of a field stop 6 and an aperture stop 5, respectively, both at a specific distance from the ground-glass and a specific distance from each other. The apertured stop 5 is held in position by another sleeve 7, the interior surface 9 of which is formed slightly conically and extends to the chamfered end (at 11) of the metal sleeve 10 opposite the ground-glass (i.e., the right-hand end in the drawing). The conical shape at 9 of the interior of sleeve 7 permits the entire closing and observing device to be readily mounted onto the housing of the graphite tube cell in mating relationship to a complementarily conically shaped socket. A (preferably recessed) sealing ring 12 makes the entire device gas tight. Both the (right-hand) surface 13 of the aperture stop 5 and the interior surface 9 of sleeve 7 are rendered reflective, as by polishing these elements if they are of suitable metal or by covering them with a suitable reflective (metallic) coating.

The device according to the invention provides four functions: (1) it forms a readily removable (e.g., hinged or otherwise easily detachable) closure of the sample introduction opening to a graphite tube cell; (2) it permits an observation of the graphite tube during the (high temperature) sample measurement without blinding or dazzling the observer; (3) because of the reflective nature of the surface of the apertured stop on the side toward the graphite sample tube or cell, it is ensured that the ground-glass (or a similar observing device) is not so strongly heated by the intense heat radiation of the incandescent graphite tube cell that the material bursts or is otherwise destroyed; (4) by the use of an apertured stop 5 in the closing and observing device the image is provided with a brightness sufficient for the observation, while the image-forming beam of rays is limited by the field stop 6 so that a sharp non-glaring image is always obtained.

What is claimed is:

1. An improved closing and observing device, specifically for use with graphite tube sample cells for flameless atomic absorption, wherein an opening is provided in the housing surrounding the cell through which the sample under analysis is introduced, said opening being provided with a closing and observing device through which the graphite tube may be observed while in a state of incandescence, the improvement in which:

said closing and observing device comprises a pinhole camera of a generally known type, said device comprising an elongated tubular member supporting a ground-glass for observation of the incandescent graphite tube adjacent one end of said member which is remote from said incandescent tube, and an apertured stop positioned a substantial distance from said one end of said member so as to act as the pinhole of the system, said device further comprising a field stop means intermediate and spaced from said apertured stop and said ground-glass for limiting the field angle of those rays which pass through said apertured stop and reach said ground-glass, so as to reduce glare by non-image-forming rays.

2. An improved closing and observing device as claimed in the claim 1, in which:

the aperture diameter of said apertured stop is of a size sufficient for the formation on said ground-glass of an image of the average-heated graphite tube cell of sufficient brightness to be readily visible.

3. An improved closing and observing device as claimed in the claim 1, in which:

the surface of said apertured stop remote from said one end and therefore on the side facing the graphite tube and the inner surfaces of the supporting structure of said apertured stop on the side thereof closer to the graphite tube are specularly reflecting.

* * * * *